(No Model.)
A. T. BINKERD.
LEVELING INSTRUMENT.
No. 393,879. Patented Dec. 4, 1888.
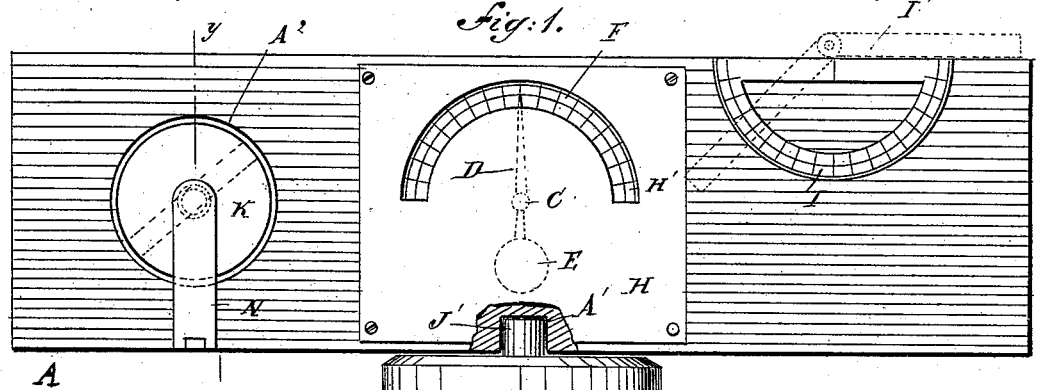
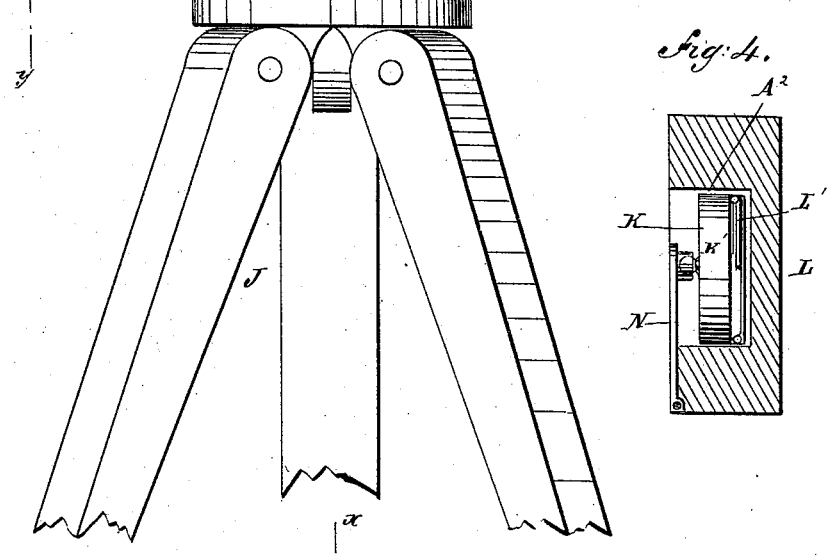
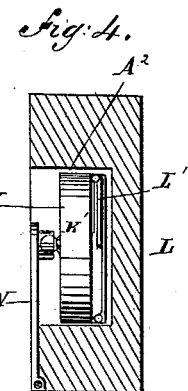
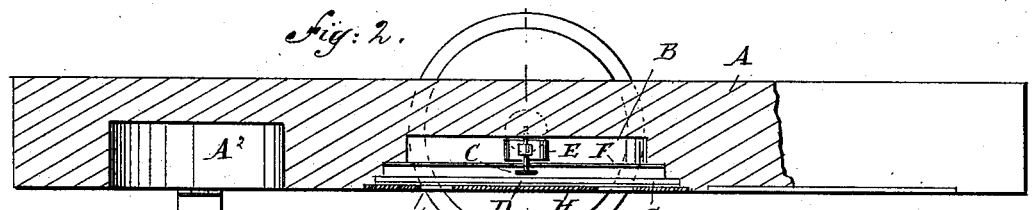
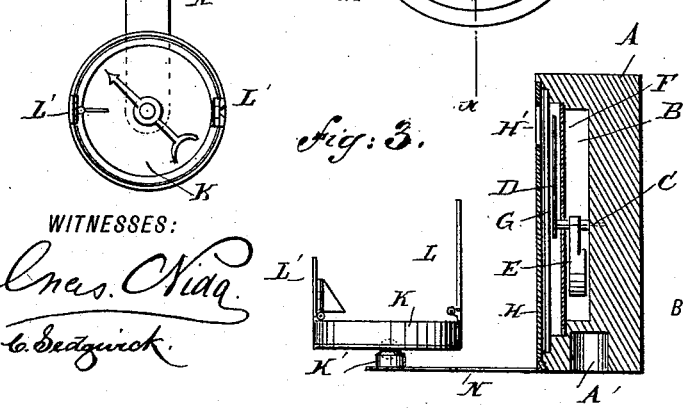
WITNESSES:
Chas. Nida
C. Sedgwick
INVENTOR.
A. T. Binkerd
BY Munn & Co
ATTORNEY.

UNITED STATES PATENT OFFICE.

AARON THOMAS BINKERD, OF ALLEGHENY, ASSIGNOR TO DUNCAN C. WHITE, OF PITTSBURG, PENNSYLVANIA.

LEVELING-INSTRUMENT.

SPECIFICATION forming part of Letters Patent No. 393,879, dated December 4, 1888.

Application filed March 16, 1888. Serial No. 267,330. (No model.)

*To all whom it may concern:*

Be it known that I, AARON THOMAS BINKERD, of Allegheny, in the county of Allegheny and State of Pennsylvania, have invented a new and Improved Instrument for Leveling and other purposes, of which the following is a full, clear, and exact description.

The object of the invention is to provide a new and improved combination-instrument adapted for leveling purposes, obtaining angles, and sighting distant points.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation, partly in section, of the improvement as mounted on a tripod. Fig. 2 is a sectional plan view of the same. Fig. 3 is a vertical cross-section of the same on the line $x$ $x$ of Fig. 2, and Fig. 4 is a like view of the same on the line $y$ $y$ of Fig. 1.

The combined instrument is mounted on a stock, A, of suitable length and shape, and provided in its middle on one side with a recess, B, into which extends a pivot, C, mounted to turn in the stock A. On the pivot C is mounted an upwardly-extending pointer, D, and from the said pivot extends downward a weighted arm, E, in line with the pointer D. The weighted arm E and the pointer D always stand in a vertical position on account of the weight on the said arm E. The pointer D indicates on a degree-scale, F, secured to the stock A directly behind the pointer D. In front of the latter is a glass, G, which is again covered by a metallic plate, H, provided with a semicircular opening, H', through which appear the upper end of the pointer D and the degree-scale F. The latter is divided into one hundred and eighty degrees and subdivisions. It will be understood that when the stock A is placed in an angular position the weighted arm E swings and causes the pointer D to indicate on the degree-scale F the number of degrees corresponding to the angle of the stock A to the horizontal plane.

Next to the covering-plate H is secured to the stock A a protractor, I, having its base I' flush with the top edge of the stock A, as is plainly shown in Fig. 1. Now, it will be understood that when the stock A is placed in an inclined position, as above described, and the pointer D indicates a certain number of degrees on the degree-scale F, then the operator can read off the number of degrees and can set a bevel-gage to this number of degrees on the top edge of the scale A and the protractor I, thus obtaining the correct angle or bevel in which the stock had been placed. It is understood that the intersecting point of the blades of the bevel-gage is put in the center of the base-line I' of the protractor I, as shown in Fig. 1. In the bottom of the stock A is also formed an opening, A', into which fits a pin, J', projecting from the top plate of a tripod, J, so that the stock A can be mounted on the said tripod J, as illustrated in Fig. 1, and turned on the said pin J' in any direction. In the side of the stock A is also formed a slot, $A^2$, into which passes a compass, K, of any approved construction, and provided at two opposite sides with folding sights L and L', to be used in the ordinary manner in connection with the compass for sighting distant points.

On the bottom of the compass K, in its middle, is formed a ball-joint, K', connected with the free end of an arm, N, pivotally connected at its other end to the side of the stock A. The entire compass K can be swung outward on the said arm N into a horizontal position, as is plainly shown in Fig. 2, and the compass can be turned on the said arm N by the ball-joint K' to any desired position, so as to take sights with the sighting-arms L and L'. When the stock A is mounted on the tripod, as above described, and the compass is swung outward, any distant object may be sighted, even if the stock A is in a level position, as the compass K can be turned by its ball-joint K' on the arm N.

It will be further understood that the stock A can be used as a plumb, as the weighted arm E and the pointer D indicate a horizontal as well as a vertical position of the stock A on the degree-scale F.

Having thus described my invention, what I claim as new, and desire to secure by Letters Patent, is—

1. The combination, with the stock, of an outward-swinging arm hinged thereto, and a compass, and a ball-and-socket joint connecting said compass and arm, substantially as set forth.

2. The combination, with the stock having a compass-receiving recess, of an arm hinged to the stock to swing toward and from its recess, a compass connected by a universal joint to said arm, and sights hinged to the compass to fold upon the face thereof, said compass and sights adapted to be inclosed in said recess when not in use, substantially as set forth.

3. The combination, with a stock adapted to be mounted on a tripod, of an arm pivoted to the said stock, and a compass provided with sights and mounted to turn on the said arm, substantially as shown and described.

4. The combination, with a stock, of a gravity-pointer mounted to swing on the said stock, a degree-scale secured to the said stock and on which the said pointer indicates, an arm pivoted to the said stock, and a compass mounted to turn on the said arm and provided with folding sights, substantially as shown and described.

AARON THOMAS BINKERD.

Witnesses:
  FRANK R. LIGGETT,
  ARTHUR WESSEL.